United States Patent [19]

Kreda

[11] 3,714,441

[45] Jan. 30, 1973

[54] PHOTOMULTIPLIER GAIN CONTROL CIRCUIT

[75] Inventor: Eugene J. Kreda, Natick, Mass.

[73] Assignee: Servo Corporation of America, Hicksville, N.Y.

[22] Filed: Dec. 13, 1971

[21] Appl. No.: 207,290

[52] U.S. Cl. ....................250/207, 250/214 R, 328/173

[51] Int. Cl. ....................H01j 39/12

[58] Field of Search...250/207, 214 R, 206; 328/173, 328/243

[56] References Cited

UNITED STATES PATENTS

| | | | |
|---|---|---|---|
| 3,171,032 | 2/1965 | Holt | 250/207 |
| 3,183,353 | 5/1965 | Baldwin | 250/207 X |
| 3,243,593 | 3/1966 | Starr et al. | 250/207 X |
| 3,487,222 | 12/1969 | Martens | 250/214 R |

*Primary Examiner*—Walter Stolwein
*Attorney*—David S. Kane et al.

[57] ABSTRACT

Automatic gain control circuit for controlling the gain of a photomultiplier. Successive pulsed reference light beams are directed onto the photomultiplier while a dc voltage is supplied thereto causing the photomultiplier to produce successive output current signals. Each current signal is transformed to a voltage signal which is then processed to derive a maximum-amplitude signal having a value related to the maximum amplitude of the signal. A differential operational amplifier circuit then compares the value of the maximum-amplitude signal with the value of a reference signal representative of a desired output current signal produced by the photomultiplier.

When the value of the maximum-amplitude signal is less than the value of the reference signal, indicating that the photomultiplier requires an increasing value of dc voltage for increasing the value of its gain, an output signal of a first polarity and having a value proportional to the difference between the two compared signals is produced by the amplifier circuit. When the value of the maximum-amplitude signal is greater than the value of the reference signal, indicating that the photomultiplier requires a decreasing value of dc voltage for decreasing the value of its gain, an output signal of a second polarity and having a value proportional to the difference between the two compared signals is produced by the amplifier circuit. A dc voltage supply control circuit coupled to the amplifier circuit receives the output signals produced by the amplifier circuit and operates in response to an output signal of the first polarity to supply a dc voltage to the photomultiplier in an increasing direction and varying at a rate determined by the value of the output signal, and in response to an output signal of the second polarity to supply a dc voltage to the photomultiplier in a decreasing direction and varying at a rate determined by the value of the output signal. The supply of dc voltage to the photomultiplier is controlled until the value of a maximum-amplitude signal is equal to the value of the reference signal.

14 Claims, 1 Drawing Figure

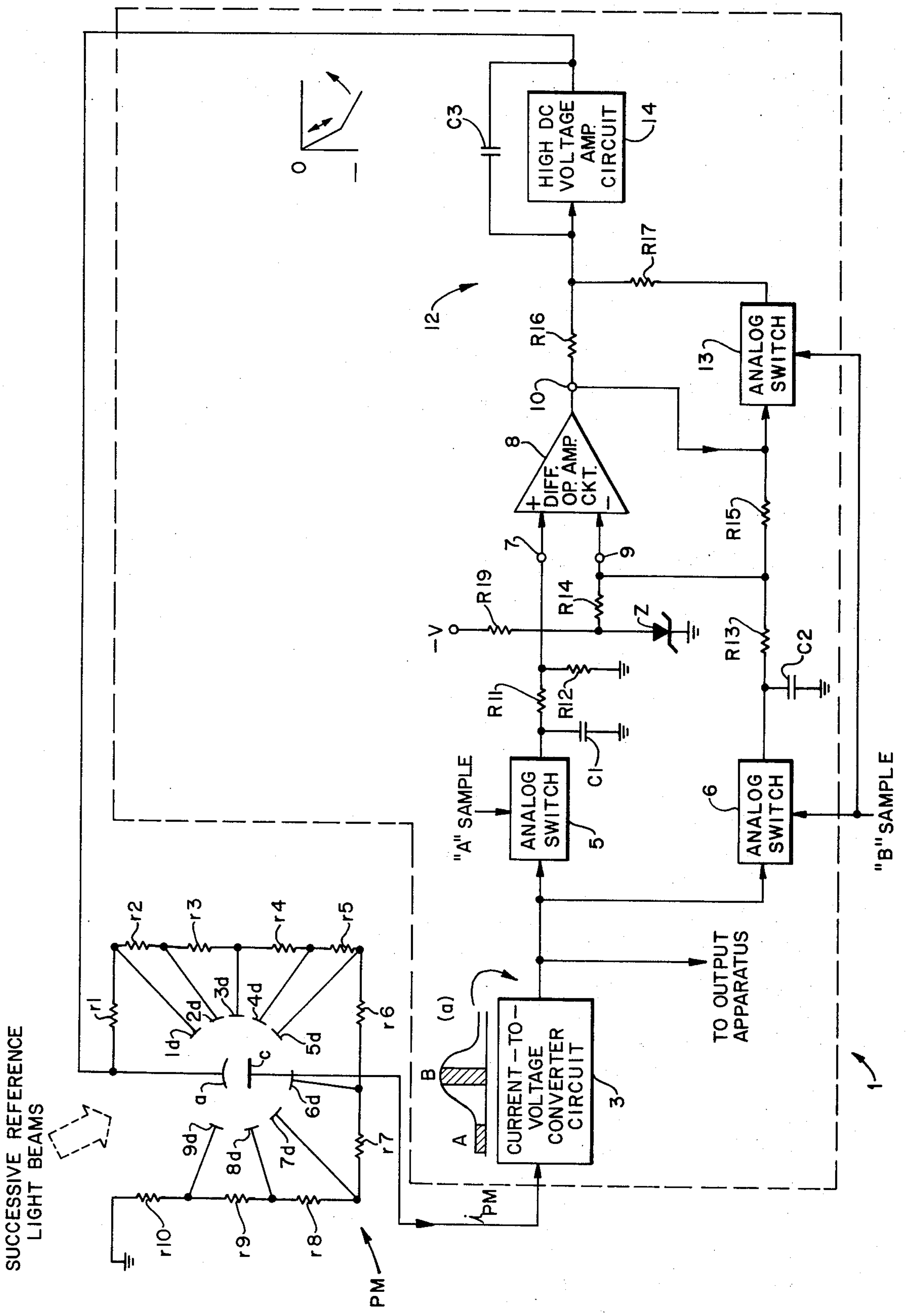
SUCCESSIVE REFERENCE LIGHT BEAMS
CURRENT-TO-VOLTAGE CONVERTER CIRCUIT
TO OUTPUT APPARATUS
"A" SAMPLE
ANALOG SWITCH
ANALOG SWITCH
"B" SAMPLE
DIFF. OP. AMP. CKT.
ANALOG SWITCH
HIGH DC VOLTAGE AMP. CIRCUIT

PHOTOMULTIPLIER GAIN CONTROL CIRCUIT

BACKGROUND OF THE INVENTION

The present invention relates to an automatic gain control circuit and, more particularly, to an automatic gain control circuit for controlling the gain of a photomultiplier to compensate for incident light variations and aging effects.

A variety of automatic gain control circuits for controlling the gain of photomultipliers are known to those skilled in the art. In one known automatic gain control circuit, a rapidly increasing dc voltage is supplied by a high voltage dc source, through a series-connected photoresistor, to a photomultiplier. The photoresistor is initially established by a lamp positioned adjacent thereto and directing its light output thereon to have a minimum value of resistance whereby the dc voltage is supplied to the photomultiplier at the maximum possible rate. When the value of the dc voltage supplied to the photomultiplier has reached the operating value of the photomultiplier and when a reference incident light beam is directed simultaneously onto the photomultiplier, an output current signal is produced by the photomultiplier. The current signal is transformed to a voltage signal and then applied to a first input of a differential operational amplifier. The photomultiplier voltage signal is compared in the differential operational amplifier with a reference voltage signal present at a second input of the amplifier and having a value representative of the desired value of output signals produced by the photomultiplier. Whenever the value of the photomultiplier voltage signal is greater than the value of the reference voltage signal, a difference voltage signal is produced by the differential operational amplifier indicating that the supply voltage and, therefore, the gain of the photomultiplier, is too high and requires downward adjustment. No difference signal is produced by the differential operational amplifier whenever the value of the photomultiplier voltage signal is less than the value of the reference voltage signal.

The difference voltage signal produced by the differential operational amplifier when the value of the photomultiplier voltage signal is greater than the value of the reference voltage signal is sampled during the time of the reference incident light beam and the sampled signal is applied to an integrating circuit. The integrating circuit includes a capacitor having an initial voltage established thereacross by means including a Zener diode. When the voltage across the capacitor increases to a certain value, by virtue of an incremental voltage increase due to the integration of the aforementioned sampled signal, it operates a lamp control circuit connected in parallel with the lamp. The lamp control circuit operates to vary the light output of the lamp, specifically, to decrease its light output, to cause the value of the resistance of the photoresistor to increase. The increase in the value of the resistance of the photoresistor causes the value of the dc voltage supplied to the photomultiplier and, consequently, the value of the photomultiplier voltage signal applied to the differential operational amplifier, to become reduced. Additional applications of reference light beams to the photomultiplier and further sampling operations take place until the value of the photomultiplier voltage signal applied to the differential operational amplifier becomes reduced to substantially the same value as the value of the reference voltage signal. When this latter condition is established, the automatic gain control circuit has achieved a stabilized operating state. At this time, the photomultiplier is used in its customary fashion for producing output signals in response to a variety of input light conditions for use by suitable output apparatus.

The abovedescribed automatic gain control circuit operates in a generally satisfactory manner for a variety of gain correction applications. However, a general disadvantage of the automatic gain control circuit is that it allows an excessively large value of dc voltage to be supplied initially to the photomultiplier, specifically, during the time that the value of the dc voltage produced by the high voltage dc source rises from its minimum value, typically, 0 volts, toward its maximum value, typically greater than −1,000 volts. This large value of dc voltage results in an overly large initial value of gain being established for the photomultiplier and, therefore, an overly large difference between the value of the photomultiplier output voltage signal applied to the differential operational amplifier and the value of the reference voltage signal. Consequently, a very large number of reference incident light beams and correspondingly large number of samples of the difference voltage signal produced by the differential operational amplifier, for example, a few thousand samples, must be made to derive the desired final value of gain for the photomultiplier. The time required for accomplishing a stabilized operating state for the automatic gain control circuit may therefore be greater than desired for many applications. An additional disadvantage of the abovedescribed automatic gain control circuit is that the voltage initially established across the capacitor provided in the integrating circuit is susceptible to wide variations as a result of normal operational variations (e.g., temperature and aging effects) occurring in the parameters of the various components of the circuit (e.g., changes in the operating voltage of the Zener diode). Consequently, the number of required samples of the difference signal produced by the differential operational amplifier to achieve the desired value of gain for the photomultiplier may vary widely over a given period, giving rise to the likelihood of erratic control of the dc voltage supplied to the photomultiplier and, thus, erratic control of the gain of the photomultiplier.

BRIEF SUMMARY OF THE INVENTION

Briefly, in accordance with the invention, a gain control circuit is provided for controlling the gain of a photomultiplier which overcomes the abovedescribed problems of supplying overly large amounts of dc voltage to the photomultiplier and the accompanying necessity of reducing the over-supply of dc voltage by means of large numbers of sampling operations. The gain control circuit of the invention also overcomes the problem of the likelihood of erratic control of the dc voltage supplied to a photomultiplier and, thus, the possible erratic control of the gain of the photomultiplier.

The gain control circuit of the invention includes a processing means which is adapted to be coupled to a photomultiplier for receiving output signals produced by the photomultiplier. An output signal is produced by the photomultiplier at such time as it is exposed to a pulsed beam of electromagnetic radiation. The processing means operates in response to an output signal produced by the photomultiplier to produce a corresponding output signal having a value directly related to the value of the output signal received thereby. A circuit means coupled to the processing means operates in response to the output signal produced by the processing means to derive a signal having a value related to the maximum amplitude of the output signal.

The value of the signal derived by the circuit means is compared in a comparator means with the value of a reference signal representative of a desired output signal produced by the photomultiplier. More specifically, the comparator means operates when the value of the signal derived by the circuit means bears a predetermined first relationship to the value of the reference signal to produce a first output signal having a value representative of the difference. The comparator means further operates when the value of the signal derived by the circuit means bears a predetermined second relationship to the value of the reference signal to produce a second output signal having a value representative of the difference. A dc supply means coupled to the comparator means receives the output signals produced by the comparator means and supplies dc voltage to the photomultiplier. Specifically, the dc supply means operates in response to a first output signal received from the comparator means to supply a dc voltage to the photomultiplier in a first direction and varying at a rate determined by the value of the first output signal, and in response to a second output signal received from the comparator means to supply a dc voltage to the photomultiplier in a second direction and varying at a rate determined by the value of the second output signal.

BRIEF DESCRIPTION OF THE DRAWING

The invention will be more fully understood from the following detailed description, taken in conjunction with the accompanying drawing, in which the single FIGURE illustrates in schematic diagram form an automatic gain control circuit in accordance with the invention for controlling the gain of a photomultiplier.

GENERAL DESCRIPTION OF THE INVENTION

Referring now to the figure, there is shown an automatic gain control circuit 1 in accordance with the invention for controlling the gain of a photomultiplier PM. The photomultiplier PM is of a conventional, commercially available type and includes an anode *a*, a cathode *c*, and a plurality of dynodes **1*d*–9*d***. In the usual manner, a plurality of resistors *r*1 –*r*10 are connected in a series fashion between the anode a and ground potential and also to the dynodes **1*d*–9*d*. As is well understood by those skilled in the art, the resistors *r*1–*r*10 serve to establish equal potentials between the dynodes 1*d*–9*d*** for achieving the well-known photomultiplication effect.

The gain of the photomultiplier PM is controlled by the controlled application of a dc voltage between the anode *a* of the photomultiplier PM and ground potential. Since variations in the lighting incident on the photomultiplier PM and effects of aging of the photomultiplier PM causes its operating value of gain to vary during its life, it is necessary that the dc voltage supplied to the photomultiplier and, therefore, the gain of the photomultiplier, be controlled in such a fashion as to cause the photomultiplier to produce output signals of an essentially constant amplitude value in response to a given light input condition. The above control of the photomultiplier PM is achieved in accordance with the present invention by means of the automatic gain control circuit 2.

As shown in the figure, the automatic gain control circuit 1 includes a current-to-voltage converter circuit 3 connected in series with the cathode c of the photomultiplier PM. The current-to-voltage converter circuit 3 serves to convert output current signals produced by the photomultiplier PM at its cathode *c* (the photomultiplier PM being basically a current device) into voltage signals. As will be described in detail hereinafter, these output current signals are produced by the photomultiplier PM in response to successive incident pulsed reference light beams, spaced apart by fixed intervals, being directed on the photomultiplier PM, the output current signals then being converted to voltage signals by the current-to-voltage converter circuit 3. A typical waveform of a voltage signal produced by the current-to-voltage converter circuit 3 in response to an incident reference light beam being directed onto the photomultiplier PM while dc voltage is supplied to the photomultiplier PM is shown at (*a*) in the figure. A particularly suitable implementation of the current-to-voltage converter circuit 3 includes a conventional operational amplifier which, in addition to performing the abovementioned conversion operations, also offers a suitable output impedance to the various other circuit elements employed therewith.

The voltage signals produced by the current-to-voltage converter circuit 3 are applied simultaneously to a pair of analog switches 5 and 6. The analog switch 5 is arranged to sample, during a predetermined first time interval, each voltage signal applied thereto by the current-to-voltage converter circuit 3, and to apply the sampled value of voltage to a storage capacitor C1 connected between its output and ground potential. In a similar manner, the analog switch 6 is arranged to sample, during a predetermined second time interval, each voltage signal applied thereto by the current-to-voltage converter circuit 3, and to apply the sampled value of voltage to a storage capacitor C2 connected between its output and ground potential. In accordance with the invention, the sampling time interval associated with the analog switch 5 is selected to essentially coincide with the beginning, or minimum-value point, of each voltage signal applied thereto by the current-to-voltage converter circuit 3, as shown, for example, at A in waveform (*a*), and the sampling time interval associated with the analog switch 6 is selected to essentially coincide with the mid-point, or maximum-value point, of each voltage signal applied thereto by the current-to-voltage converter circuit 3, as shown, for example, at B in waveform (*a*). The abovedescribed sampling operations performed by the analog switches 5 and 6 are initiated by appropriately timed sampling signals, designated in the figure as "A" sample and "B"

sample, which are applied to the analog switches 5 and 6, respectively, during the time that each incident light beam is directed onto the photomultiplier PM. Each of the analog switches 5 and 6 may be suitably implemented by means of a field effect transistor in which the source electrode is connected to the current-to-voltage converter circuit 3, the drain electrode is connected to the associated capacitor C1 or C2, and the gate electrode is connected to the particular source of the sampling signal ("A" sample or "B" sample signal). Any suitable means may be employed for producing the "A" and "B" sample signals.

The sample values of voltages applied to the capacitors C1 and C2 by the analog switches 5 and 6, respectively, cause the capacitors C1 and C2 to be charged to those values. In accordance with the invention, the voltages developed across the capacitors C1 and C2 are retained between successive samplings of successive output pulses produced by the current-to-voltage converter circuit 3 by the selection of suitable forms for the analog switches 5 and 6 (e.g., the aforementioned field effect transistors) whereby the analog switches 5 and 6, together with the respective capacitors C1 and C2, act as conventional sample-and-hold circuits.

The voltage established across the capacitor C1 during the "A" sampling operation is coupled through voltage-scaling resistors R11 and R12 connected in parallel therewith to a first input terminal 7 of a differential operational amplifier circuit 8, and the voltage established across the capacitor C2 during the "B" sampling operation is coupled through a voltage-scaling resistor R13 to a second input terminal 9 of the differential operational amplifier circuit 8. In addition to the above voltage-scaling resistors, a voltage-scaling resistor R14 is connected in series with the input terminal 9 of the differential operational amplifier circuit 8 and a voltage-scaling resistor R15 is connected between an output terminal 10 of the differential operational amplifier circuit 8 and the input terminal 9 of the differential operational amplifier circuit. The aforementioned voltage-scaling resistors R11–R14 serve, in a well-known fashion, to scale the voltages developed across the capacitors C1 and C2 to suitable levels for use by the differential operational amplifier circuit 8. The voltage-scaling resistor R15 serves to scale the output voltage produced by the differential operational amplifier circuit 8, also in a well-known fashion, to achieve a particular level of output voltage for given voltages at the input terminals 7 and 9.

The differential operational amplifier circuit 8, as employed in the present invention, is arranged to subtract the value of the voltage present at its input terminal 7 (the scaled value of voltage developed across the capacitor C1) from the value of the voltage present at its other input terminal 9 (the scaled value of voltage developed across the capacitor C2) and to compare the value of the resulting differential voltage, representing a scaled version of the approximate peak amplitude of the voltage signal produced by the current-to-voltage converter circuit 3, with the value of a reference voltage. An output voltage is then produced by the differential operational amplifier circuit 8 having a value and polarity as determined by the results of the aforementioned comparison between the values of the differential voltage and the reference voltage. The reference voltage with which the aforementioned differential voltage is compared is established across a Zener diode Z by means of a negative voltage supply −V connected to the anode of the Zener diode Z through a resistor R19. The cathode of the Zener diode Z is connected directly to ground potential. The Zener diode Z is typically and preferably of a type having a zero-temperature coefficient, thereby insuring stable operation over a wide range of operating temperatures. The values of the scaling resistors R11–R14 are selected to provide voltages to the differential operational amplifier circuit 8 scaled to the value of the reference voltage established across the Zener diode Z.

In the event the aforementioned differential voltage produced in the differential operational amplifier circuit 8 has a value less than the value of the reference voltage, an output (or "error") voltage of a first polarity (e.g., positive polarity) and having a value proportional to the difference between the two compared voltages is produced by the differential operational amplifier circuit 8 at its output terminal 10. This particular output voltage condition is employed in the invention to indicate that the gain of the photomultiplier PM is less than desired and requires upward adjustment. In the event the differential voltage produced in the differential operational amplifier circuit 8 has a value greater than the value of the reference voltage, an output (or "error") voltage of a second polarity, (e.g., negative polarity) and having a value proportional to the difference between the two compared voltages is produced by the differential operational amplifier circuit 8 at its output terminal 10. This output voltage condition is employed in the present invention to indicate that the gain of the photomultiplier PM is greater than desired and requires downward adjustment.

The output voltage produced by the differential operational amplifier 8 is employed to adjust the value of the gain of the photomultiplier PM, either upwardly or downwardly, via a dc voltage supply control arrangement 12 connected between the output terminal 10 of the differential operational amplifier circuit 8 and the anode a of the photomultiplier PM.

As shown in the figure, the dc voltage supply control arrangement 12 includes a resistor R16 connected between the output terminal 10 of the differential operational amplifier circuit 8 and the input of a high dc voltage amplifier circuit 14, and a third analog switch 13 and a resistor R17 connected in series between the output terminal 10 of the differential operational amplifier circuit 8 and the input of the high dc voltage amplifier circuit 14. The analog switch 13 may be of the same type as the analog switches 5 and 6. The voltage supply control arrangement 12 further comprises a feedback capacitor C3 connected between the output and the input of the high dc voltage amplifier circuit 14.

The feedback capacitor C3, together with the high dc voltage amplifier circuit 14 and the resistors R16 and R17 constitute a high dc voltage integrating amplifier circuit. As employed in the present invention, this integrating amplifier circuit serves to produce a dc output voltage which increases or decreases at a rate proportional to the current flowing through the resistor R16 or through the resistor R17, as established by the output voltage produced by the amplifier circuit 8. More specifically, and as will be described hereinafter, during each "B" sample time interval, the output voltage produced by the differential operational amplifier circuit 8 is coupled through the analog switch 13, which is operated by the aforementioned "B" sample signal, and causes current to flow through the resistor R17 and to be applied to the high dc voltage amplifier circuit 14. The high dc voltage amplifier circuit 14, which may be implemented by a variety of circuit components well known to those skilled in the art, and the capacitor C3 then operate to cause a dc voltage to be supplied to the photomultiplier PM which increases or decreases at a rate proportional to the value of the current flowing through the resistor R17. The specific direction of supply of the dc voltage to the photomultiplier PM, that is, in an increasing or decreasing direction, is determined by the polarity of the output voltage produced by the differential operational amplifier circuit 8. As will also be described hereinafter, between "B" sample time intervals, the output voltage produced by the differential operational amplifier circuit 8 (which voltage is retained or "stored" between "B" samples by virtue of the sample-and-hold mode of operation of the analog switches 5 and 6 and the associated capacitors C1 and C2), causes current to flow through the resistor R16 and to be applied to the high dc voltage amplifier circuit 14. The high dc voltage amplifier circuit 14 and the capacitor C3 operate in this instance to cause a dc voltage to be supplied to the photomultiplier PM which increases or decreases at a rate proportional to the value of current flowing through the resistor R16. Again, the direction (increasing or decreasing) of supply of dc voltage to the photomultiplier PM is determined by the polarity of the output voltage produced by the differential operational amplifier circuit 8. In accordance with the invention, the rate of increase or decrease of the dc voltage supplied to the photomultiplier PM during "B" sample time intervals is made to be considerably greater than the rate of increase or decrease of dc voltage supplied to the photomultiplier PM between successive "B" sample time intervals, for example 100 to 1. The purpose of this 100:1 difference is to maintain reasonably constant the value of dc voltage supplied to the photomultiplier PM during a given "B" sample time interval until the occurrence of the next "B" sample time interval. Thus, significant changes in the value of dc voltage supplied to the photomultiplier PM occur during "B" sample time intervals and relatively minor changes occur between "B" sample time intervals. The abovementioned 100:1 ratio may be simply achieved in the present invention by selecting a value for the resistor R16 which is 100 times greater than the value of the resistor R17. Other ratios may also be used as determined by particular applications for which the gain control circuit 1 is intended.

DETAILED OPERATION

In the quiescent operating condition of the gain control circuit 1 and the photomultiplier PM, no dc voltage is supplied to the photomultiplier PM by the high dc voltage amplifier circuit 14. As a result, an output current signal having a 0 ampere value is produced by the photomultiplier PM, and a voltage signal of 0 volt value is produced by the current-to-voltage converter circuit 3. With a 0 volt signal at the output the current-to-voltage converter circuit 3, the capacitor C1 has 0 volts thereacross as a result of the "A" sampling operation and, similarly, the capacitor C2 has zero volts thereacross as a result of the "B" sampling operation. With 0 volts across each of the capacitors C1 and C2, a zero-voltage signal is compared in the differential operational amplifier circuit 8 with the value of the reference voltage established across the Zener diode Z. An output voltage of a positive polarity, and having the maximum possible value, is accordingly produced by the differential operational amplifier circuit 8. This condition of the output voltage produced by the differential operational amplifier circuit 8 thereby indicates that the photomultiplier PM has its maximum need for dc supply voltage from the dc voltage supply control arrangement 12.

When the analog switch 13 is operated by the "B" sample signal, the output voltage (positive) produced by the differential operational amplifier circuit 8 causes current to flow through the resistor R17 (via the analog switch 13) and to be applied to the high dc voltage amplifier circuit 14. (The output voltage also establishes current flow through the resistor R16 and into the high dc voltage amplifier circuit 14 at this time, but inasmuch as the value of the resistance R16 is selected to be much larger than the value of resistance R17 (e.g., 100 times larger), the value of current through the resistor R16 is much smaller (e.g., 100 times less) than the value of current through the resistor R17 and has negligible effect on the power amplifier circuit 14.) The current flowing through the resistor R17, having a value directly proportional to the value of the output voltage produced by the differential operational amplifier circuit 8, causes the high dc voltage amplifier circuit 14 and the capacitor C3 to supply a dc output voltage, in an increasing direction, to the photomultiplier PM. Typically, the dc voltage supplied to the photomultiplier PM is a negative dc voltage as indicated in the figure. The rate at which the dc voltage is supplied to the photomultiplier PM is determined by the value of the current flowing through the resistor R17 and, thus, by the value of the output voltage produced by the differential operational amplifier circuit 8. In the present case, with the photomultiplier PM producing a 0 ampere output current signal, and the current applied to the high dc voltage amplifier circuit 14 being at its maximum value, the dc voltage is supplied to the photomultiplier in an increasing (negative) fashion, at the maximum possible rate.

After the "B" sample time interval has terminated, the analog switch 13 is rendered inoperative until the next "B" sample time interval, and the current flow through the resistor R17 ceases to flow. However, a relatively small amount of current continues to flow into the high dc voltage amplifier circuit 14 until the next "B" sample time interval by virtue of current flow now established through the resistor R16 by the output voltage of the differential operational amplifier circuit 8. (In this connection, it is to be recalled that the output voltage produced by the differential operational amplifier circuit 8 during a given "B" sample time interval does not disappear until the next "B" sample time interval due to the aforementioned sample-and-hold mode of operation of the analog switches 5 and 6 and the associated capacitors C1 and C2). As a result of the current flow established through the resistor R16, the high dc voltage amplifier circuit 14 and the capacitor C3 operate, in the same manner as earlier described, to supply dc voltage to the photomultiplier PM. In this case, the dc voltage supplied to the photomultiplier PM increases at a rate determined by the value of the current flowing through the resistor R16 into the power amplifier circuit 14 and, thus, by the value of the output voltage produced by the amplifier circuit 8. As stated previously, since dc voltage is supplied to the photomultiplier PM which changes very little between "B" sample time intervals as compared with changes during "B" sample time intervals, the dc voltage supplied to the photomultiplier PM until the next "B" sample time interval increases very little from that established during the just-terminated "B" sample time interval.

The photomultiplier PM operates in response to the abovedescribed increasing (negative) supply of dc voltage, both during and following the "B" sample time interval, to increase the value of its gain, and when the photomultiplier is exposed to an incident reference light beam it produces an output current signal having a value exceeding the earlier value of 0 amperes. This current signal increases in an analog fashion from a minimum value to some maximum value and then back to its minimum value. The current signal is converted to a voltage signal by the current-to-voltage converter circuit 3, for example, as shown at waveform (*a*) in the figure, and applied simultaneously to the analog switches 5 and 6. The voltage signal is sampled during the "A" sample and "B" sample time intervals and voltages having values equal to the sampled values of voltages are established across the capacitors C1 and C2, respectively. The voltages across the capacitors C1 and C2, after being scaled by the scaling resistors R11–R14, are respectively applied to the first and second input terminals 7 and 9 of the differential operational amplifier circuit 8. The value of the voltage present at the input terminal 7 (the scaled value of the voltage developed across the capacitor C1) is subtracted in the differential operational amplifier circuit 8 from the value of the voltage present at the input terminal 9 (the scaled value of the voltage developed across the capacitor C2) and the value of the differential voltage, representing a scaled version of the approximate peak amplitude of the voltage signal produced by the current-to-voltage converter circuit 3, is compared with the value of the reference voltage established across the Zener diode Z. The differential operational amplifier circuit 8 operates to produce an output voltage, again of a positive polarity, and having a value proportional to the value of the difference between the two compared voltages. In the present case, the value of the output voltage produced by the differential operational amplifier circuit 8 is less than that produced thereby during the previous "B" sample time interval since the difference between the values of the present "B" sample and "A" sample voltages is considerably greater than before, causing a smaller difference to exist between the values of the differential voltage and the reference voltage compared in the amplifier circuit 8.

The output voltage produced by the amplifier circuit 8 causes current of a value directly proportional to the value of the output voltage to flow through the resistor R17, in the same manner as earlier described, and into the high dc voltage amplifier circuit 14. The high dc voltage amplifier circuit 14 and the capacitor C3 then operate, also in the same manner as earlier described, to supply a dc voltage to the photomultiplier PM which increases at a rate determined by the value of the current supplied to the high dc voltage amplifier circuit 14. In the present case, the rate at which the dc voltage supplied to the photomultiplier PM increases is less than during the preceding cycle of operation of the gain control circuit 1 due to the reduced value of the current supplied to the high dc voltage amplifier circuit 14 (via the resistor R17) during the present cycle of operation.

In the same manner as described earlier, after termination of the "B" sample time interval, current is supplied to the high dc voltage amplifier circuit 14 via the resistor R16 (instead of the resistor R17) and the value of dc voltage supplied to the photomultiplier PM is changed very slightly until the next "B" simple time interval.

The photomultiplier PM and the automatic gain control circuit 1 continue to operate in the same manner as described hereinabove until the value of the difference between the scaled value of "A" sample and "B" sample voltages during a given cycle of operation is equal to the value of the reference voltage established across the Zener diode Z. At this time, the output voltage produced by the differential operational amplifier circuit 8 is at essentially 0 volts and indicates that the gain of the photomultiplier PM has stabilized at the desired value. Hence, there is no further control at this time of the high dc voltage amplifier circuit 14.

The above discussion of the operation of the automatic gain control circuit 1 to control the gain of the photomultiplier PM has been directed to establishing increases in the value of gain of the photomultiplier PM from essentially zero value to some greater, final value. However, should the gain of the photomultiplier PM increase from its desired final value for any reason whatsoever, the automatic gain control circuit 1 is able to accomplish the necessary downward adjustment. In this case, the difference between the values of the "B" sample and "A" sample voltages (after scaling) is greater than the value of the reference voltage established across the Zener diode Z. As a result, the differential operational amplifier circuit 8 operates to produce an output voltage of a negative polarity and having a value directly proportional to the difference between the value of the differential voltage and the value of the reference voltage. This output voltage causes current of a value directly proportional to the value of the output voltage to flow through the resistor R17 during the "B" sample time interval and to be applied to the high dc voltage amplifier circuit 14. However, in the present case, the current flowing through the resistor R17 is in a direction opposite to that established during gain-increasing operations. In the present case, the high dc voltage amplifier circuit 14 and the capacitor C3 operate to decrease the supply of dc voltage (negative) to the photomultiplier PM at a rate determined, as before, by the value of the current flowing through the resistor R17 into the high dc voltage amplifier circuit 14. Also, as before, between the present "B" sample time interval and the next "B" sample time interval, the dc voltage supplied to the photomultiplier PM is caused to decrease at a rate determined by the value of current caused to flow through the resistor R16 into the high dc voltage amplifier circuit 14 between the "B" sample time intervals. The above operations are repeated until the gain of the photomultiplier PM has been adjusted downwardly to the desired value, at which time the value of the differential voltage produced in the differential operational amplifier circuit 8 is equal to the value of the reference voltage established across the Zener diode Z.

Once the gain of the photomultiplier PM has stabilized at the desired value, it may now be used in its customary fashion in which it is exposed to a variety of input light conditions between reference light beams, causing output signals to be produced by the photomultiplier PM for use by suitable output apparatus. The output apparatus may be connected, for example, to the output of the current-to-voltage converter circuit 3.

MODIFICATIONS

An automatic gain control circuit 1 has been described hereinabove in which two samples, namely, "A" and "B" samples, are taken of each voltage signal produced by the current-to-voltage converter circuit 3 for the purpose of determining the approximate peak amplitude of the voltage signal. It is to be appreciated, however, that in many applications where the "A" sample voltage has an essentially constant value, it may be eliminated and the "B" sample used by itself for determining peak amplitude. In this case, the "A" sampling portions of the automatic gain control circuit 1 are eliminated and the "B" sampling portions are retained. Other forms of "peak detecting" circuits may also be used. Other changes and modifications will become apparent to those skilled in the art without departing from the invention as called for in the appended claim.

What is claimed is:

1. A gain control circuit for controlling the gain of a photomultiplier, said photomultiplier being exposed to a pulsed beam of electromagnetic radiation and operative when exposed to the pulsed beam of electromagnetic radiation to produce an output signal, said gain control circuit comprising:

processing means adapted to be coupled to the photomultiplier and operative to receive an output signal produced by the photomultiplier when exposed to a pulsed beam of electromagnetic radiation and to produce a corresponding output signal having a value directly related to the value of the output signal produced by the photomultiplier;

circuit means coupled to the processing means and operative in response to the output signal produced by the processing means to derive a signal having a value related to the maximum amplitude of the output signal produced by the processing means;

comparator means coupled to the circuit means and adapted to compare the value of the signal derived by the circuit means with the value of a reference signal, the value of the reference signal being representative of a desired output signal produced by the photomultiplier, said comparator means being operative when the value of the signal derived by the circuit means bears a predetermined first relationship to the value of the reference signal to produce a first output signal having a value representative of the difference, and operative when the value of the signal derived by the circuit means bears a predetermined second relationship to the value of the reference signal to produce a second output signal having a value representative of the difference; and dc supply means coupled to the comparator means and adapted to be coupled to the photomultiplier, said dc supply means receiving the output signals produced by the comparator means and being operative in response to a first output signal received from the comparator means to supply a dc voltage to the photomultiplier in a first direction and varying at a rate determined by the value of the first output signal, and being operative in response to a second output signal received from the comparator means to supply a dc voltage to the photomultiplier in a second direction and varying at a rate determined by the value of the second output signal.

2. A gain control circuit in accordance with claim 1 wherein the dc supply means comprises:

first means coupled to the comparator means and receiving the output signals produced by the comparator means, said first means being operative during a portion of the time of exposure of the photomultiplier to the pulsed beam of electromagnetic radiation and in response to a first or second output signal from the comparator means to supply a dc voltage to the photomultiplier in the first or second direction, respectively, said dc voltage varying at a first rate determined by the value of the first or second output signal; and second means coupled to the comparator means and receiving the output signals produced by the comparator means, said second means being operative following the aforesaid portion of the time of exposure of the photomultiplier to the beam of electromagnetic radiation and in response to a first or second output signal from the first circuit means to supply a dc voltage to the photomultiplier in the first or second direction, respectively, said dc voltage varying at a second rate determined by the value of the first or second output signal and differing from the first rate.

3. A gain control circuit in accordance with claim 2 wherein the first rate is greater than the second rate.

4. A gain control circuit for controlling the gain of a photomultiplier, said photomultiplier being exposed to a pulsed beam of electromagnetic radiation and operative when exposed to the pulsed beam of electromagnetic radiation to produce an output signal, said gain control circuit comprising:

processing means adapted to be coupled to the photomultiplier and operative to receive an output signal produced by the photomultiplier when exposed to a beam of electromagnetic radiation and to derive a corresponding output signal therefrom;

sampling means coupled to the processing means and operative to sample the output signal produced by the processing means at predetermined first and second time intervals, thereby to provide first and second sampled signals, respectively;

first circuit means coupled to the sampling means and adapted to determined the difference in the values of the first and second sampled signals produced by the sampling means and to compare the value of the difference with the value of a reference signal, the value of the reference signal being representative of a desired output signal produced by the photomultiplier, said first circuit means being operative when the value of the difference between the values of the first and second samples signals bears a predetermined first relationship to the value of the reference signal to produce a first output signal having a value representative of the difference, and operative when the value of the difference between the values of the first and second sampled signals bears a predetermined second relationship to the value of the reference signal to produce a second output signal having a value representative of the difference; and second circuit means coupled to the first circuit means and adapted to be coupled to the photomultiplier, said second circuit means receiving the output signals produced by the first circuit means and being operative in response to a first output signal received from the first circuit means to supply a dc voltage to the photomultiplier in a first direction and varying at a rate determined by the value of the first output signal, and being operative in response to a second output signal received from the first circuit means to supply a dc voltage to the photomultiplier in a second direction and varying at a rate determined by the value of the second output signal.

5. A gain control circuit in accordance with claim 4 wherein the second circuit means comprises:

first means coupled to the first circuit means and receiving the output signals produced by the first circuit means, said first means being operative during a portion of the time of exposure of the photomultiplier to the beam of electromagnetic radiation and in response to a first or second output signal from the first circuit means to supply a dc voltage to the photomultiplier in the first or second direction, respectively, said dc voltage varying at a first rate determined by the value of first or second output signal; and second means coupled to the first circuit means and receiving the output signals produced by the first circuit means, said second means being operative following the aforesaid portion of the time of exposure of the photomultiplier to the beam of electromagnetic radiation and in response to a first or second output signal from the first circuit means to supply a dc voltage to the photomultiplier in the first or second direction, respectively, said dc voltage varying at a second rate determined by the value of the first or second output signal and differing from the first rate.

6. A gain control circuit in accordance with claim 5 wherein the first rate is greater than the second rate.

7. A gain control circuit in accordance with claim 6 wherein:

the first means is operative to supply a dc voltage to the photomultiplier during the predetermined second time interval; and the second means is operative to supply a dc voltage to the photomultiplier after the predetermined second time interval.

8. A gain control circuit in accordance with claim 7 wherein: the first means comprises:

first resistance means;

switch means coupled to the first circuit means and to the first resistance means and operative during the predetermined second time interval to couple a first or second output signal produced by the first circuit means to the first resistance means;

said first resistance means being operative to derive a first current signal from the first or second output signal coupled thereto by the switch means, said first current signal having a value directly related to the value of the first or second output signal; and dc amplifier circuit means coupled to the first resistance means and operative in response to the first current signal derived by the first resistance means to supply a dc voltage to the photomultiplier at the first rate, said first rate varying directly with the value of the first current signal; and the second means comprises:

second resistance means coupled to the first circuit means and operative following the predetermined second time interval to derive a second current signal from a first or second output signal produced by the first circuit means, said second current signal having a value directly related to the value of the first or second output signal; and the aforesaid dc amplifier circuit means, said dc amplifier circuit means being coupled to the second resistance means and operative in response to the second current signal derived by the second resistance means to supply a dc voltage to the photomultiplier at the second rate, said second rate varying directly with the value of the second current signal.

9. A gain control circuit in accordance with claim 8 wherein:

the value of the first resistance means is less than the value of the second resistance means whereby the value of the first current signal is greater than the value of the second current signal.

10. A gain control circuit in accordance with claim 5 wherein: the sampling means comprises:

first switch means coupled to the processing means and timed to sample the output signal produced by the processing means at its minimum-value point, thereby to derive the first sampled signal;

first storage means coupled to the first switch means and operative to store the first sampled signal;

second switch means coupled to the processing means and timed to sample the output signal produced by the photomultiplier at its maximum-value point, thereby to derive the second sampled signal; and second storage means coupled to the second switch means and operative to store the second sampled signal.

11. A gain control circuit in accordance with claim 10 wherein: the first storage means includes a first capacitance; the second storage means includes a second capacitance; and the first circuit means comprises:

differential amplifier circuit means having a first input terminal coupled to the first capacitance and a second input terminal coupled to the second capacitance; and means coupled to the second input terminal of the differential amplifier circuit means for establishing the reference voltage signal.

12. A gain control circuit for controlling the gain of a photomultiplier, said photomultiplier being exposed to successive pulsed beams of electromagnetic radiation and operative when exposed to the successive pulsed beams of electromagnetic radiation to produce corresponding successive output signals, said gain control circuit comprising:

processing means adapted to be coupled to the photomultiplier and operative to receive the successive output signals produced by the photomultiplier when exposed to the successive beams of electromagnetic radiation and to derive corresponding output signals therefrom::

sampling means coupled to the processing means and operative to sample each output signal produced by the processing means at predetermined first and second time intervals, thereby to provide first and second sampled signals, respectively, for each output signal produced by the processing means;

first circuit means coupled to the sampling means and adapted to determine the difference in the values of the first and second sampled signals produced by the sampling means for each output signal produced by the processing means and to compare the value of the difference with the value of a reference signal, the value of the reference signal being representative of desired output signals produced by the photomultiplier, said first circuit means being operative when the value of the difference between the values of the first and second sampled signals bears a predetermined first relationship to the value of the reference signal to produce a first output signal having a value representative of the difference, and operative when the value of the difference between the values of the first and second sampled signals bears a predetermined second relationship to the value of the reference signal to produce a second output signal having a value representative of the difference;

first means coupled to the first circuit means and receiving the output signals produced by the first circuit means, said first means being operative during each predetermined second time interval and in response to a first or second output signal from the first circuit means to supply a dc voltage to the photomultiplier in a first direction or in a second direction, respectively, and varying at a first rate determined by the value of the first or second output signal; and second means coupled to the first circuit means and receiving the output signals produced by the first circuit means, said second means being operative in the time between successive second time intervals and in response to a first or second output signal from the first circuit means to supply a dc voltage to the photomultiplier in the first direction or in the second direction, respectively, and varying at a second rate determined by the value of the first or second output signal, said second rate differing from the first rate.

13. A gain control circuit in accordance with claim 12 wherein the first rate is greater than the second rate.

14. A gain control circuit in accordance with claim 13 wherein: the first means comprises:

first resistance means;

switch means coupled to the first circuit means and to the first resistance means and operative during each predetermined second time interval to couple a first or second output signal produced by the first circuit means to the first resistance means;

said first resistance means being operative to derive a first current signal from the first or second output signal coupled thereto by the switch means, said first circuit signal having a value directly related to the value of the first or second output signal; and dc amplifier circuit means coupled to the first resistance means and operative in response to the first circuit signal derived by the first resistance means to supply a dc voltage to the photomultiplier at the first rate, said first rate varying directly with the value of the first current signal; and the second means comprises:

second resistance means coupled to the first circuit means and operative in the time between successive second time intervals to derive a second current signal from a first or second output signal produced by the first circuit means, said second current signal having a value directly related to the value of the first or second output signal; and the aforesaid dc amplifier circuit means, said dc amplifier circuit means being coupled to the second resistance means and operative in response to the second current signal derived by the second resistance means to supply a dc voltage to the photomultiplier at the second rate, said second rate varying directly with the value of the second current signal.

* * * * *